3,267,700
GAS FUELED CANDLE
Eddy Marie Kommer, Paulus Potterlaan 29, Rijswijk, Netherlands, and Gerardus Cornelis van Gulik, Pomonalaan 7, The Hague, Netherlands
Filed Dec. 23, 1963, Ser. No. 334,968
Claims priority, application Netherlands, Dec. 21, 1962, 287,082
5 Claims. (Cl. 67—87)

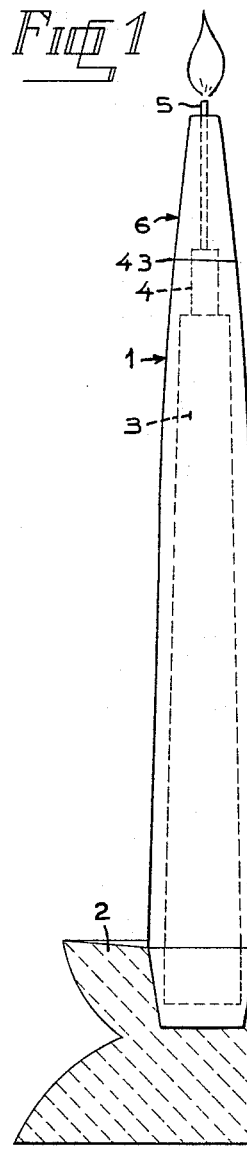
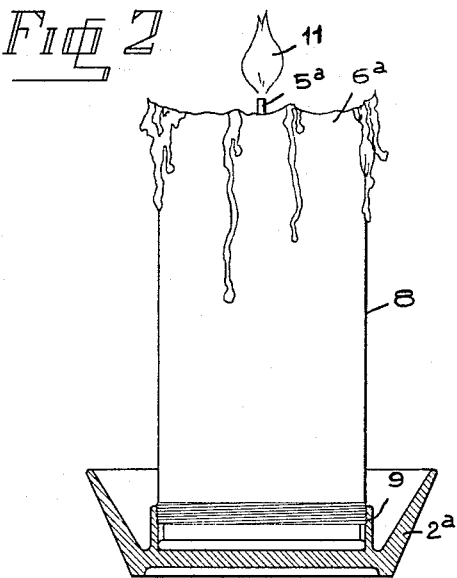
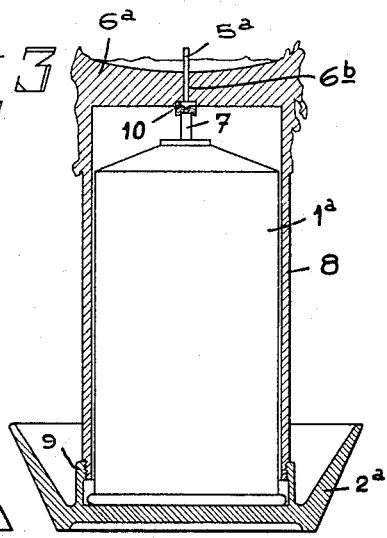

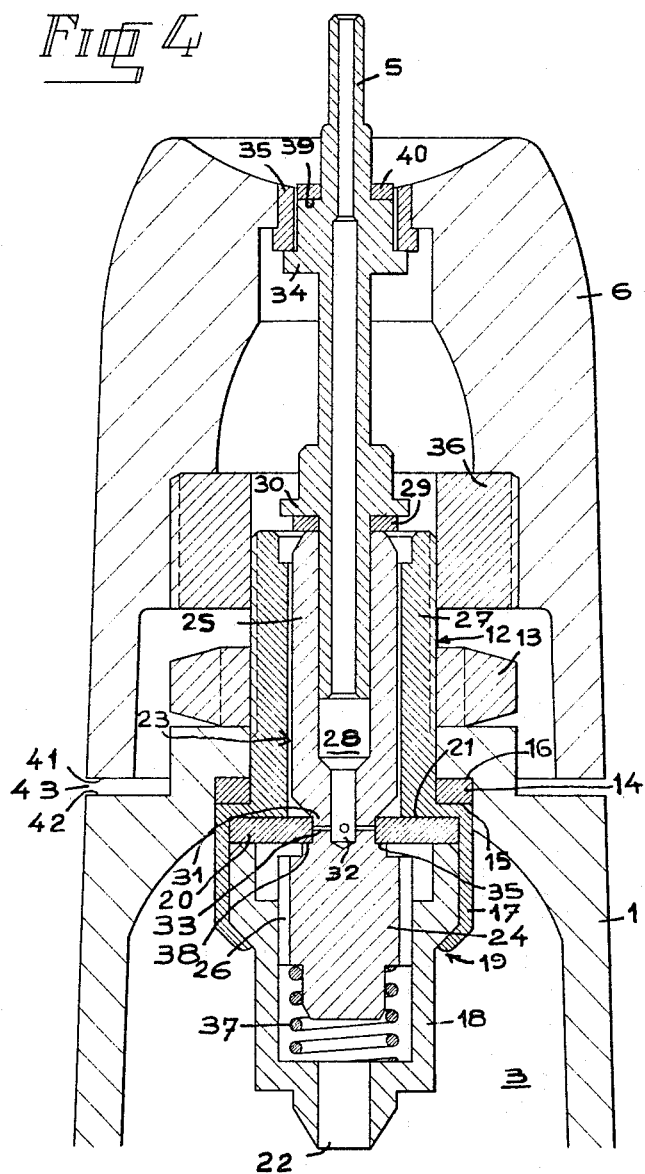

The invention relates to a candle or like implement which is fueled by combustible gas of the butane type, i.e. by gases such as butane or propane which assume gaseous form when released under usual atmospheric temperatures and pressures, but which remain largely in liquid form at such temperatures when held under sufficient pressures.

In particular the invention is concerned with a fuel outlet valve mechanism adapted to be mounted at the upper end portion of a fuel container which forms the body member of a gas fueled candle.

With prior gas fueled candles the construction of the fuel outlet valve mechanism used therein is such that a separate valve is needed for fuel charging purposes, while no provisions have been made for an automatic cut off of the fuel supply to the burner element in case of a capsizing candle.

Accordingly one object of this invention is to provide a gas outlet valve mechanism for a gas fueled candle or like implement constructed so as to avoid the use of a separate fuel charge valve.

A second object of the invention is to provide a gas outlet valve mechanism for a gas fueled candle or the like with safety means which cause the valve to close or effect an interruption of the fuel supply to the burner element in emergency cases such as in the case of a capsizing candle.

These and other objects and features of the invention will be appreciated more fully from the following detailed description which taken in conjunction with the accompanying drawings discloses three embodiments of a candle-like implement constructed in accordance with the invention.

In the drawings:

FIG. 1 is a side view partly in section of a candle according to the invention;

FIG. 2 is a view similar to FIG. 1, but showing a different shape of the candle body;

FIG. 3 is a central longitudinal section of the candle shown in FIG. 2;

FIG. 4 is an enlarged longitudinal section of the upper portion of the candle shown in FIG. 1;

Figure 5:
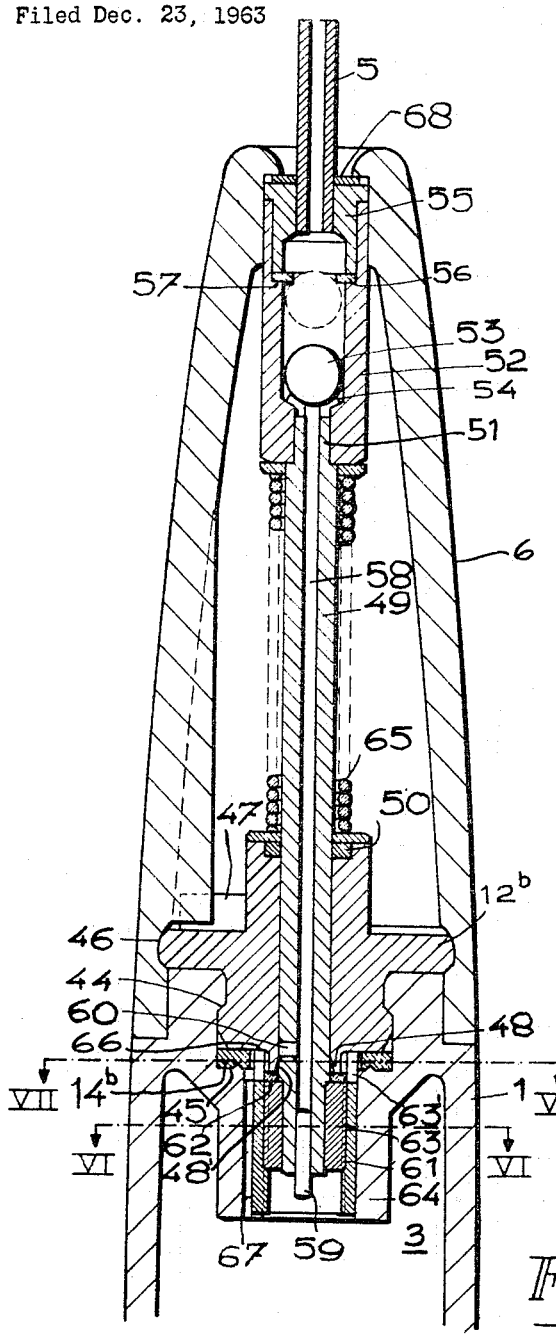
FIG. 5 is a longitudinal section similar to FIG. 4, but showing another embodiment of the fuel outlet valve mechanism.

With reference to FIG. 1 an elongated hollow body member 1 is removably mounted in a base 2 and encloses a fuel chamber 3, which is constructed to hold fuel of the butane type under pressure.

At the upper end portion of the body member 1 a fuel outlet valve mechanism 4 is provided, including a depressable hollow valve stem or burner element 5 which extends upwardly through a hollow tip member 6 constituted by an independent upward tapering extension of the body member 1. Two embodiments of the valve mechanism 4 will be later described in greater detail.

The tip member 6 is mounted to afford at least angular movement thereof with respect to the body member 1 so as to depress the valve stem or to allow this valve stem to move upwardly respectively.

In the embodiment illustrated in FIG. 3 the body member 1a is constituted by a container of the type which is used for charging the fuel chamber of various types of gas fueled cigar lighters. The container 1a is placed on the bottom of the cup-shaped base 2a and has its usual depressable charging tube 7 extended by a burner element 5a, passing through an opening 6b in a tip member 6a. In this embodiment the tip member 6a has a downward extension or skirt 8 which surrounds the fuel container 1a and is threaded at its lower end into an upstanding ring portion 9 of the base 2a. In the position of no use the skirt is threaded into the ring portion 9 to such a slight extent that there is no operative relationship between the tip member 6a and the burner element 5a. In this position the charging tube 7 of the container is in its elevated closed position so that the fuel is prevented from escaping through the tube 7 and the burner element connected therewith. As the tip member 6a is turned to move its skirt portion 8 downwardly and further into the ring portion 9 of the base 2a, it engages a collar 10 provided on the burner element 5a which latter is thus depressed together with the charging tube 7. The fuel which is then allowed to discharge from the container 1a may be ignited to produce a flame 11, the height of which will depend on the rate of flow of gaseous fuel through the burner element which in turn depends on the angle through which the tip member is turned.

In FIG. 4, which shows one embodiment of the valve mechanism used in the candle of FIG. 1, a valve housing 12 is provided in the upper end portion of the body member 1 and secured thereto by means of a nut 13, a sealing 14 being interposed between opposite shoulders 15 and 16 of the valve housing and of the body member respectively. In the lower thin-walled end portion 17 a spring seat member 18 is fixed as by bending the lower edge of the end portion 17 at 19, an elastic seat ring 20 being clamped between a shoulder 21 of the valve housing and the upper end of the spring seat member. The seat member 18 has gas inlet opening 22 extending through its bottom.

A movable valve member is indicated at 23, the lower portion 24 of which is slidably guided in the valve seat member 18 and the upper portion 25 of which extends upwardly through the upper end portion 27 of the valve housing 12. The cooperating sliding surfaces of the spring seat member 18 and of the lower valve portion 24 leave a number of passages 26 between them. The upper portion 25 of the valve member 23 is provided with a bore 28, in which the burner element or tube 5 is inserted in sealing relation, a gasket 29 being interposed between the upper end of the valve portion 25 and a first collar 30 on the burner tube 5. Between the upper and lower portions 25 and 24 of the valve member 23 there is a reduced neck portion 31 which is closely surrounded by the resilient seat ring 20. The outer surface of the neck portion 31 communicates with a reduced extension 32 of the bore 28 through a number of radial openings 33.

The burner tube 5 is provided with a second collar 34 which is adapted to cooperate with an insert 35 of the tip member, said insert seating with its lower end on the upper surface of the collar. The tip member has a nut member 36 coaxially fixed to it, which is threaded on the upper end of the valve housing portion 27 and by means of which the tip member 6 may be screwed down and upwards so as to actuate the valve mechanism. In FIG. 4 the valve mechanism is shown in its closed position, the lower portion 24 of the valve member 23 being urged by a spring 37 into its upper position, in which the shoulder 38 of the portion 24 and the outer surface of the neck portion 31 are in sealing contact with the corresponding surface areas of the seat ring 20 so as to prevent the fuel from flowing from the chamber 3 through the inlet opening 22 and the passages 26 into the openings 33 connected with the burner tube 5.

As the tip member 6 is twisted to move downwardly the valve member 23 is also moved downwardly as a result of the pressing contact between the insert 35 and the collar 34 of the burner tube 5. This downward movement causes the inner marginal portion of the seat ring 20 to bend downwardly so that the fuel is allowed to leak past the shoulder 38 and the outer surface of the neck portion 31 into the openings 33. The height of the flame produced by ignition of the fuel issuing from the upper end of the burner tube 5 depends on the extent to which the nut member 36 is screwed down on the valve housing portion 27.

As may readily appear from FIG. 4 the burner tube and valve assembly may also be moved downwardly to open the valve mechanism independent of any turning movement of the tip member 6. Such independent opening of the valve mechanism may be effected by exerting a downward pressure on an upper shoulder 39, e.g. by means of the usual supply container (not shown), the charging tube of which may be telescoped on the burner tube with its leading end into sealing contact with a gasket 40 on the shoulder 39. For charging purposes the supply container is moved to depress the movable valve member into its lowermost position, in which the passage from the openings 33 past the outer surface of the neck portion 31 and the shoulder 38 towards the passages 26 has reached its maximum size. In this position supply fuel may flow from the supply container through the burner tube 5, the bores 28 and 32, the openings 33, past the cooperating surfaces of the seat ring 20, the shoulder 38 and the neck portion 31, through the passages 26 and the opening 22 into the container 3. Thus it will be appreciated that a separate valve for fuel charging purposes, as is usually applied in gas fuel lighters, is avoided. A maximum flame height may be determined by properly sizing the gap 43 which in a position of no use exists betwen the lower end 41 of the tip member 6 and the corresponding shoulder 42 of the body member 1. The abutting contact between the said end 41 and the shoulder 42 corresponds with the maximum flame height. For charging purposes, however, the valve member may still be moved downwardly to a greater extent.

In the embodiment shown in FIG. 4 the insert 35 is preferably made of a material having a relatively low melting point, so that the insert will weaken and melt if superheating of the burner tube 5 occurs, e.g. as a result of a capsizing movement of the candle. The valve member is then allowed to move upwardly into its closed position under the action of the spring 37, so that the flame will go out.

In the embodiment illustrated in FIG. 5 a valve housing 12b is fixed to the upper end portion of the body member 1 as by a snap fit 44 and in sealing contact with a gasket 14b on a shoulder 45 of the body member 1. The lower end 48 of the valve housing 12b is constructed to form a valve seat.

Figure 6:
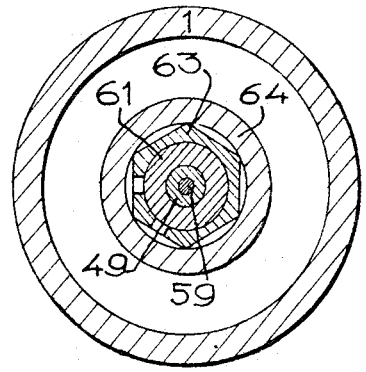
FIG. 6 is a section taken on line VI—VI of FIG. 5.
Figure 7:
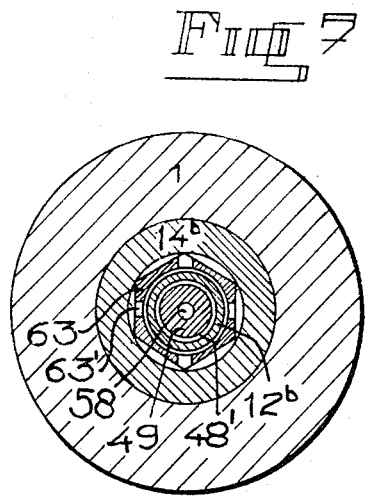
FIG. 7 is a section taken on line VII—VII of FIG. 5.

In this embodiment the tip member 6 is mounted to afford only an angular movement thereof with respect to the body member 1, the tip member being longitudinally held by a flange portion of the valve housing 12b as at 46 and the angular movement of same being limited by an abutment 47 on said flange portion. A hollow valve stem 49 is guided in the housing 12b in sealing relation therewith as at 50 and is allowed to move angularly and longitudinally with respect to said housing. A ball valve housing 52, containing a ball valve 53, is secured with a press fit on the reduced upper end portion 51 of the valve stem 49. Under normal conditions (as shown in FIG. 5) the ball valve 53 rests on a seat 54 formed at the uppermost end of the valve stem 49, said seat being radially slit so as to allow fuel to flow laterally past the ball valve. A cap member 55 secured to the burner tube 5 is inserted with a press fit in the upper end portion of the ball valve housing 52, an inwardly projecting resilient gasket 56 being clamped between the lower end of the cap member 55 and a shoulder 57 of the ball valve housing 52 to serve as an upper seat for the ball valve 53 for safety purposes. The ball valve housing and cap member assembly 52, 55 is slidably guided in the upper portion of the tip member 6, the cooperating sliding surfaces of the assembly and the tip member having for example a hexagonal cross sectional shape so as to prevent relative angular movement therebetween. Consequently an angular movement of the tip member relative to the body member 1 urges the ball valve housing 52 and the valve stem 49 to move along through the same angle. The central bore 58 of the valve stem 49 is closed at its lower end by a plug 59, while a radial passage 60 connects this central bore with the outer surface of the valve stem. A valve body 61 is secured with a press fit on the lower end portion of the valve stem 49. The valve body carries a gasket 62 closely surrounding the adjacent portion of the valve stem and adapted to cooperate with the seat 48. The valve body 61 is threaded in a sleeve 63 which in turn is slidably guided in an inwardly and downwardly projecting part 64 of the body member 1. The cooperating sliding surfaces of the body part 64 and of the sleeve 63 are so formed (e.g. of a generally hexagonal shape, as shown in FIG. 6) as to prevent the sleeve 63 from turning with respect to the body part 64. A spring 65 surrounding the part of the valve stem 49 located between the lower end of the ball valve housing 52 and the upper end of the valve housing 12b tends to press the valve body 61 upwardly into its closed position which is shown in FIG. 5. In this position the gasket 62 is in sealing contact with the seat 48 so that fuel is prevented from flowing from the container 3 into the bore 58, while the sleeve 63, which is slit as at 63', abuts with its upper end against the adjacent lower surface 66 of the valve housing 12b.

By turning the tip member 6 in a counter-clockwise direction the valve body 61 (having left hand screw thread) is screwed down in the sleeve so that the gasket 62 moves free from its seat 48 and fuel is allowed to flow from the container 3 through passages 67 between the body portion 64 and the sleeve 63, the slits 63', between the gasket 62 and the seat 48, past the downwardly flaring inner wall 48', through the opening 60 into the bore 58 of the valve stem 49 and from there past the ball valve 53 to the burner tube 5. Again the height of the flame produced by ignition of the fuel issuing from the the upper end of the burner tube 5 can be regulated by varying the angular position of the tip member 6.

In a similar manner as described in connection with the embodiment of FIG. 4 the valve body 61 may also be opened without the valve stem 49 being actuated by the tip member 6. An axial downwardly directed force exterted on the burner tube 5 or on the associated parts as well will provide a downward movement of the valve body 61 free from its seat 48. As with this manner of operation the valve stem 49 and the associated valve body 61 are not turned the sleeve 63 will move along with the valve body as a unit. When actuating the valve mechanism in this manner the valve stem may be depressed to a much greater extent than in the case of actuation by means of the tip member 6, the angular movement of the latter being limited by th abutment 47. In fact the valve stem 49 may be depressed through a distance which is large enough to displace the opening 60 to a level below the seat 48 so as to establish a substantially unobstructed passageway between the opening 60 and the passage 67. As will be appreciated the downwardly directed force may be exerted by means of a supply container when it is desired to recharge the candle with fuel. For this purpose the cap 55 is provided with a gasket 68 as a seat for the leading end of the charge tube of the supply container.

As hereinbefore described the ball valve 53 normally rests on the seat 54. If, however, the candle tilts, as for example in case of accidental capsizing, the ball valve will be elevated and pressed against its upper seat 56 under the combined influence of the decreased axial component of gravity and the dynamic forces of the gas flow, the latter forces being substantially increased as a result of a violent expansion of any liquid fuel which may enter into the bore 58 through the opening 60. In this upper position the ball valve 53 interrupts the supply of fuel from the container 3 to the outlet opening of the burner tube 5 so that the flame goes out. The ball valve 53 thus forms an effective safety means, which is a modification of the safety means used in the embodiment shown in FIG. 4. The ball valve 53 remains in its upper position, even after the candle is set up again, until it is pushed downwardly by a needle like element which may be introduced through the burner tube 5.

While in the foregoing disclosure, particular embodiments of the invention have been described, it will, of course, be understood that the invention is not to be limited thereto, since many variations and modifications may be made by those skilled in the art; and it is contemplated, therefore to cover all such modifications as fall within the true spirit and scope of this invention by the appended claims.

What we claim is:

1. A gas fueled candle or like implement, including a hollow body member having therein a chamber constructed to hold fuel of the butane type under pressure, a fuel outlet valve mechanism mounted in the top portion of said body member, a tip member enclosing at least the space above said valve mechanism and having an opening in the upper portion thereof, means mounting said tip member to move angularly with respect to said body member, said valve mechanism including a depressible hollow valve stem extending by a burner tube passing through said opening in said tip member, spring means tending to press the valve stem upwardly into its closed position, the upper portion of the valve stem carrying the burner tube being mounted for a free downward movement through said tip member to open the valve mechanism under the action of an axial downwardly directed force exerted directly on the valve stem and burner tube assembly, the tip member and the valve stem being interconnected to depress the valve stem also as a result of an angular movement of the tip member.

2. A gas fueled candle or like implement, including a hollow body member having therein a chamber constructed to hold fuel of the butane type under pressure, a fuel outlet valve mechanism mounted in the top portion of said body member, a tip member enclosing at least the space above said valve mechanism and having an opening in the upper portion thereof, means mounting said tip member for up and down threading movement with respect to said body member, said valve mechanism including a depressible hollow valve stem extended by a burner tube passing through said opening in said tip member, spring means tending to press the valve stem upwardly into its closed position, the upper portion of the valve stem carrying the burner tube being mounted for a free downward movement through said tip member to open the valve mechanism under the action of an axial downwardly directed force exerted directly on the valve stem and burner tube assembly, said tip member having a shoulder engaging a collar on said valve stem so as to depress the valve stem along with a downward screwing movement of said tip member.

3. A gas fuel candle or like implement according to claim 2, in which the said shoulder is formed on an insert secured to said tip member, said insert being made of a material having a relatively low melting point so as to allow the valve stem and burner tube assembly to move upwardly into the closed position when the insert melts as a result of its contact with an adjacent superheated part of the valve stem and burner tube assembly.

4. A gas fueled candle or like implement, including a hollow body member having therein a chamber constructed to hold fuel of the butane type under pressure, a fuel outlet valve mechanism mounted in the top portion of said body member, a tip member enclosing at least the space above said valve mechanism and having an opening in the upper portion thereof, means mounting said tip member to move angularly with respect to said body member, said valve mechanism including a depressible hollow valve stem extended by a burner tube passing through said opening in said tip member, said valve stem carrying a valve body at its lower end, said valve body being mounted for up and down threading movement in a sleeve which is axially slidably but non-rotatably guided with respect to the body member, there being at least an upper limit for the sliding movement of said sleeve, spring means tending to press the valve stem upwardly into its closed position, the upper portion of the valve stem being axially slidably but non-rotatably guided through said tip member so as to permit the valve mechanism to be opened selectively under the action of an axially downwardly directed force exerted directly on the valve stem and burner tube assembly and as a result of an angular movement of the tip member.

5. A gas fueled candle or like implement, including a hollow body member having therein a chamber constructed to hold fuel of the butane type under pressure, a fuel outlet valve mechanism mounted in the top portion of said body member, a tip member enclosing at least the space above said valve mechanism and having an opening in the upper portion thereof, means mounting said tip member to move angularly with respect to said body member, said valve mechanism including a depressible hollow valve stem extended by a burner tube passing through said opening in said tip member, spring means tending to press the valve stem upwardly into its closed position, the upper portion of the valve stem carrying the burner tube being mounted for a free downward movement through said tip member to open the valve mechanism under the action of an axial downwardly directed force exerted directly on the valve stem and burner tube assembly, the tip member and the valve stem being interconnected to depress the valve stem also as a result of an angular movement of the tip member, a ball valve housing being incorporated in the valve stem and burner tube assembly, said ball valve housing comprising a lower seat and an upper seat for a ball valve which is adapted to normally rest on the lower seat but is permitted to move into sealing contact with the upper seat under conditions of decreased axial component of gravity and substantially increased dynamic forces of the gas fuel flow, the lower seat being slit to allow fuel passage with the ball valve resting on it.

References Cited by the Examiner

UNITED STATES PATENTS

| | | | |
|---|---|---|---|
| 2,686,652 | 8/1954 | Carlson et al. | 251—353 X |
| 2,970,606 | 2/1961 | Williams | 251—351 X |
| 3,066,516 | 12/1962 | Falligant et al. | 67—87 |
| 3,180,374 | 4/1965 | Muller | 251—354 X |

FREDERICK L. MATTESON, JR., *Primary Examiner.*

R. A. DUA, *Assistant Examiner.*